(12) United States Patent
Howlett

(10) Patent No.: US 8,061,720 B2
(45) Date of Patent: Nov. 22, 2011

(54) SLEDGE HOCKEY DEVICE INCLUDING A SEAT AND ACCOMPANYING UNDERCARRIAGE

(76) Inventor: Laurie Nelson Howlett, Peterborough (CA)

( * ) Notice: Subject to any disclaimer, the term of this patent is extended or adjusted under 35 U.S.C. 154(b) by 292 days.

(21) Appl. No.: 12/385,089

(22) Filed: Mar. 30, 2009

(65) Prior Publication Data
US 2009/0250888 A1 Oct. 8, 2009

Related U.S. Application Data

(60) Provisional application No. 61/064,868, filed on Mar. 31, 2008.

(51) Int. Cl.
*B62B 13/02* (2006.01)
(52) U.S. Cl. .................. 280/21.1; 280/11.18; 280/12.1; 280/14.25; 280/27
(58) Field of Classification Search ............... 280/11.18, 280/12.1, 14.25, 16, 20, 21.1, 27, 28
See application file for complete search history.

(56) References Cited

U.S. PATENT DOCUMENTS

| | | | | |
|---|---|---|---|---|
| 3,512,195 A * | 5/1970 | Porsche Ferdinand Alexander et al. ............................ 441/65 | | |
| 3,583,722 A * | 6/1971 | Jacobson ........................ 280/16 | | |
| 4,353,573 A * | 10/1982 | Morgan .......................... 280/606 | | |
| 5,277,141 A * | 1/1994 | Csepregi .......................... 114/43 | | |
| 5,868,405 A * | 2/1999 | Lavecchia et al. .......... 280/14.21 | | |
| 5,957,471 A * | 9/1999 | Weeks .............................. 280/18 | | |
| 6,139,031 A * | 10/2000 | Wingard ..................... 280/14.28 | | |
| 6,311,990 B1 * | 11/2001 | Landry ....................... 280/14.26 | | |
| 6,328,317 B1 * | 12/2001 | Benoit ..................... 280/11.221 | | |
| 6,345,827 B1 * | 2/2002 | Benoit ..................... 280/11.221 | | |
| 6,349,950 B1 * | 2/2002 | Levy et al. ....................... 280/22 | | |
| 6,520,512 B1 * | 2/2003 | Lachance ......................... 280/28 | | |
| 2001/0013687 A1 * | 8/2001 | Cormican ....................... 280/28 | | |
| 2008/0203685 A1 * | 8/2008 | Lachance ....................... 280/28 | | |
| 2010/0314844 A1 * | 12/2010 | Spah .......................... 280/11.18 | | |

* cited by examiner

*Primary Examiner* — J. Allen Shriver, II
*Assistant Examiner* — James Triggs
(74) *Attorney, Agent, or Firm* — Dowell & Dowell, P.C.

(57) ABSTRACT

A sledge hockey device including a seat portion and an undercarriage portion that includes a pair of elongate blade support portions each having a first upper contact surface region, provided for communicating with a second lower contact surface region of a transverse support portion. A pair of transverse support portions are provided. The first upper and second lower contact surface regions also include a plurality of complementary engagement formations to provide a positive engagement and lateral indexing between the elongate blade support portions and the transverse support portions. The elongate blade support portions and the transverse support portions are maintained in engagement by a plurality of coupling members.

4 Claims, 2 Drawing Sheets

SLEDGE HOCKEY DEVICE INCLUDING A SEAT AND ACCOMPANYING UNDERCARRIAGE

FIELD OF THE INVENTION

The present invention relates to the sport of sledge hockey

DESCRIPTION OF THE RELATED ART

Sledge hockey was developed years ago as an activity for those who are physically challenged and has become some popular that it is now emerging in many countries as a sport for able-bodied athletes. Skills and techniques have come along way since the early days of the sport. There remains a continuing need to improve the structure of the sledge hockey device to address the advancing skills of its players.

BRIEF DESCRIPTION OF THE DRAWINGS

Several preferred embodiments of the present invention will be provided, by way of examples only, with reference to the appended drawings, wherein.

DESCRIPTION OF THE PREFERRED EMBODIMENTS

Figure 1:
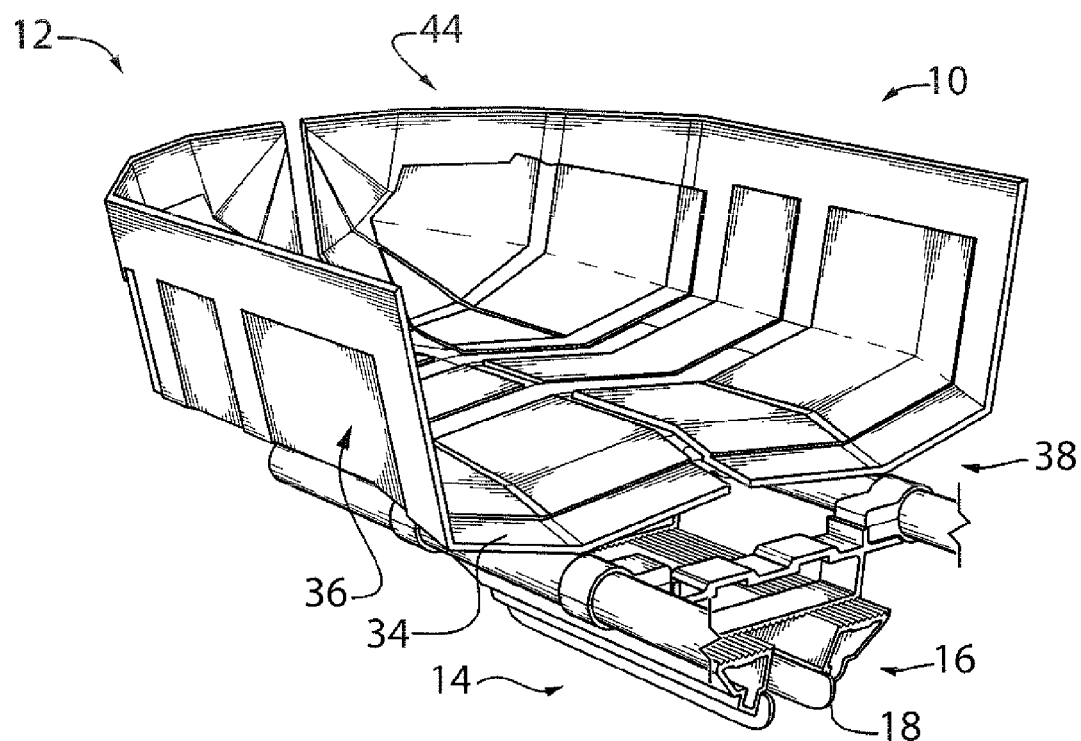
FIG. 1 is a fragmentary perspective view of a sledge hockey device.

It should be understood that the invention is not limited in its application to the details of construction and the arrangement of components set forth in the following description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings. Furthermore, and as described in subsequent paragraphs, the specific mechanical configurations illustrated in the drawings are intended to exemplify embodiments of the invention. However, other alternative mechanical configurations are possible which are considered to be within the teachings of the instant disclosure. Furthermore, unless otherwise indicated, the term "or" is to be considered inclusive.

As will be described below with respect to the figures, there is provided a sledge hockey device comprising a seat portion and an undercarriage portion, the undercarriage portion including a pair of elongate blade support portions, each elongate blade support portion having a first upper contact surface region, and a pair of transverse support portions, each transverse support portions having a second lower contact surface region, the first upper and second lower contact surface regions being provided with a plurality of complementary engagement formations to provide a positive engagement between the elongate blade support portions and the transverse support portions and a plurality of coupling members for coupling the elongate blade support portions with the transverse support portions.

In some embodiments, the complementary formations allowing for lateral indexing of the elongate support portions relative to the transverse support portions to adjust a spacing between the blade support portions.

In some embodiments, the complementary formations providing the upper and lower contact surface regions with a saw-tooth profile.

In some embodiments, the coupling members including fasteners extending between the upper and lower contact surface regions.

In some embodiments, the elongate blade support portions including a lower anchor region for anchoring a sledge hockey blade therewith.

Another embodiment provides a sledge hockey device comprising a seat portion and an undercarriage portion, the undercarriage portion including a pair of elongate blade support portions, the seat portion including a base formation and an upright periphery extending rearwardly from a front boundary, the base formation having a central raised region and a pair of laterally spaced valley regions.

In some embodiments, the seat portion includes a pair of lateral strut members, a pair of lateral segments, each including a portion of the upright periphery, the front boundary and the base formation, the lateral segments being supported by the lateral strut members.

Figure 2:
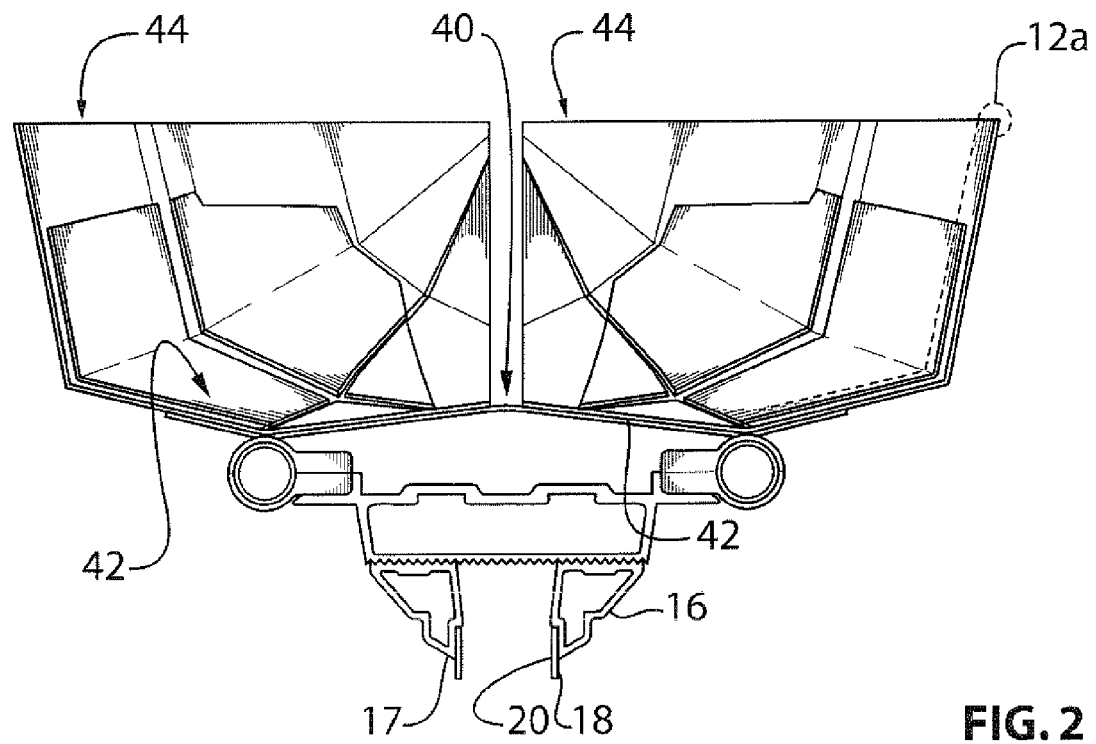
FIG. 2 is a sectional view of the device of FIG. 1.
Figure 3:
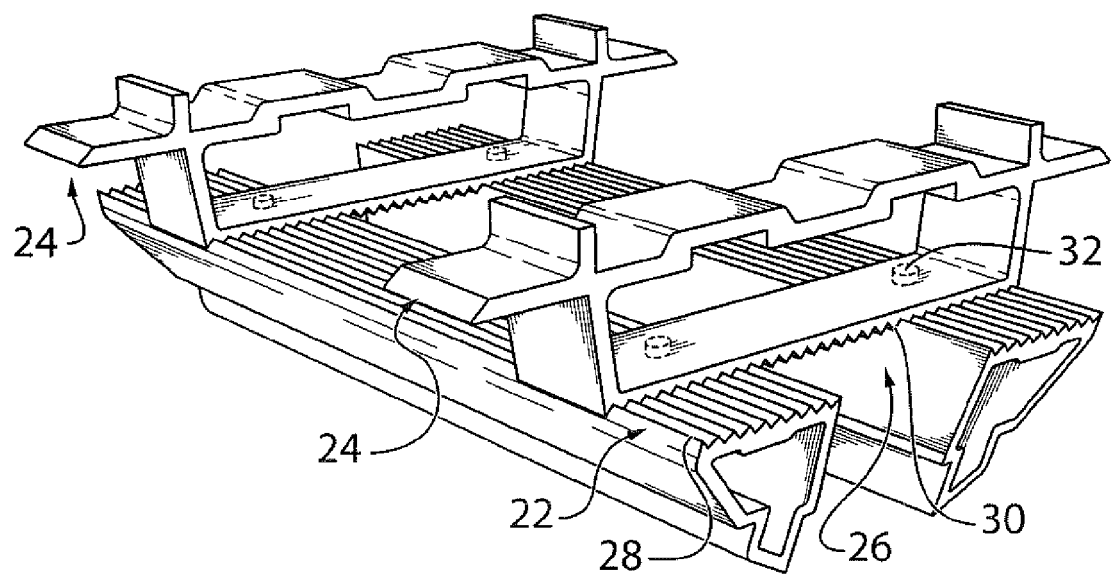
FIG. 3 is a perspective view of a portion of the device of FIG. 1.

Referring now to FIGS. 1 to 3, a sledge hockey device is shown at 10 comprising a seat portion 12 and an undercarriage portion 14. The undercarriage portion 14 includes a pair of elongate blade support portions 16, a lower anchor region 17 for anchoring a sledge hockey blade 18 therewith, by way of fasteners shown schematically at 20. Each elongate blade support portion has a first upper contact surface region 22.

A pair of transverse support portions is provided at 24. Each transverse support portion 24 has a second lower contact surface region 26. The first upper and second lower contact surface regions 22 and 26 are provided with a plurality of complementary engagement formations 28, 30 to provide a positive engagement between the elongate blade support portions 16 and the transverse support portions 24. A plurality of coupling members, in the form of fasteners shown schematically at 32, are provided for coupling the elongate blade support portions 16 with the transverse support portions 24 and extend between the upper and lower contact surface regions 22, 26.

The complementary formations allowing for lateral indexing of the elongate support portions 16 relative to the transverse support portions 24 to adjust a spacing between the blade support portions 16. In this case, the complementary formations 28, 30 provide each of the upper and lower contact surface regions 22, 26 with a saw-tooth profile.

The seat portion 12 includes a base formation 34 and an upright periphery 36 extending rearwardly from a front boundary 38. The base formation 34 has a central raised region 40 and a pair of laterally spaced valley regions 42.

The seat portion is provided, in this case, in the form of a pair of shell segments 44, each including a portion of the upright periphery 36, the front boundary 38 and the base formation 34, the lateral segments being positioned and supported by a pair of lateral strut members 42. The seat is also provided with sufficient cushioning for the comfort of the athlete, such as by way of a foam layer or the like as shown in dashed lines at 12a.

Thus, the structure of the undercarriage portion 14 provides a stable support for the blades 18 while permitting a relatively straightforward means to adjust the spacing of the blades according to the unique needs of the sledge hockey athlete from one game to the next. The seat portion 12 offers an enhanced support for the athlete by allowing the athlete to engage the seat more fully by resting each buttock in a corresponding valley region 42.

As can be seen in the figures, the blade supports are asymmetrical about their cross section. The right hand blade support as viewed in FIG. 2 has the blade supported on its left hand side, while the left hand blade support has the blade supported on its right hand side. It can be said, then, in this orientation that the blades are disposed along neighbouring inner regions of the blade supports. Thus, when the blade supports are placed immediately beside one another, the blades themselves are closely positioned, which may provide the athlete with a feel of a single blade. Meanwhile, the blade supports may be reversed so that the blades are disposed along opposed outer regions of the blade supports. This would have the effect of providing a wider spacing for the blades for a given blade support spacing. Then, if the blade supports are spaced as par away as possible, the blades give a relatively much wider stance, offering still further lateral support, and hence a different operative feel, for the athlete.

While the present invention has been described for what are presently considered the preferred embodiments, the invention is not so limited. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

The invention claimed is:

1. A sledge hockey device comprising a seat portion and an undercarriage portion, the undercarriage portion including a pair of elongate blade support portions, each elongate blade support portion having a first upper contact surface region, and a pair of transverse support portions, each transverse support portions having a second lower contact surface region, the first upper and second lower contact surface regions being provided with a plurality of complementary engagement formations to provide a positive engagement between the elongate blade support portions and the transverse support portions and a plurality of coupling members for coupling the elongate blade support portions with the transverse support portions, the complementary formations allowing for lateral indexing of the elongate support portions relative to the transverse support portions to adjust a spacing between the blade support portions.

2. A device as defined in claim 1, the complementary formations providing the upper and lower contact surface regions with a saw-tooth profile.

3. A device as defined in claim 2, the coupling members including fasteners extending between the upper and lower contact surface regions.

4. A device as defined in claim 3, the elongate blade support portions including a lower anchor region for anchoring a sledge hockey blade therewith.

* * * * *